(12) United States Patent
Truemper

(10) Patent No.: US 10,392,113 B2
(45) Date of Patent: Aug. 27, 2019

(54) GALLEY COOLING SYSTEM AND METHOD OF OPERATING A GALLEY COOLING SYSTEM

(71) Applicant: AIRBUS OPERATIONS GMBH, Hamburg (DE)

(72) Inventor: Torsten Truemper, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/331,356

(22) Filed: Oct. 21, 2016

(65) Prior Publication Data

US 2017/0101185 A1 Apr. 13, 2017

Related U.S. Application Data

(63) Continuation of application No. PCT/EP2015/058835, filed on Apr. 23, 2015.

(30) Foreign Application Priority Data

Apr. 24, 2014 (EP) .................................... 14165772

(51) Int. Cl.
*B64D 11/04* (2006.01)
*B64D 11/00* (2006.01)
(Continued)

(52) U.S. Cl.
CPC .......... *B64D 11/04* (2013.01); *B64D 11/0007* (2013.01); *B64D 13/08* (2013.01); *B64D 2013/0629* (2013.01)

(58) Field of Classification Search
CPC .... B64D 11/04; B64D 13/08; B64D 11/0007; B64D 2013/0629
(Continued)

(56) References Cited

U.S. PATENT DOCUMENTS 7,716,939 B1 * 5/2010 Morales ............. H05K 7/20836
361/688
9,045,229 B2 6/2015 Roering
(Continued)

FOREIGN PATENT DOCUMENTS

DE 199 52 523 A1 5/2001
DE 10 2010 031 909 A1 1/2012
(Continued)

OTHER PUBLICATIONS

Extended European Search Report for Application No. 14165772 dated Sep. 29, 2014.
(Continued)

*Primary Examiner* — Frantz F Jules
*Assistant Examiner* — Steve S Tanenbaum
(74) *Attorney, Agent, or Firm* — Jenkins, Wilson, Taylor & Hunt, P.A.

(57) ABSTRACT

A galley cooling system for an aircraft includes a trolley compartment which includes a cooling unit. A first cooling fluid manifold connects to a cooling fluid outlet or a cooling fluid inlet and has a first cooling fluid manifold wall defining a portion of a lateral boundary of a receiving space of the trolley compartment. A first cooling fluid opening is in the first cooling fluid manifold wall connecting the first cooling fluid manifold to the receiving space of the trolley compartment. A second cooling fluid manifold connected to the cooling fluid inlet or outlet of the cooling unit has a second cooling fluid manifold wall defining a portion of an upper boundary of the receiving space of the trolley compartment, a second cooling fluid opening in the second cooling fluid manifold wall to connect the second cooling fluid manifold to the receiving space of the trolley compartment.

20 Claims, 4 Drawing Sheets

(51) Int. Cl.
*B64D 13/08* (2006.01)
*B64D 13/06* (2006.01)

(58) Field of Classification Search
USPC .............................................. 62/96
See application file for complete search history.

(56) References Cited

U.S. PATENT DOCUMENTS

| | | |
|---|---|---|
| 2010/0224726 A1 | 9/2010 | Lu et al. |
| 2012/0025679 A1* | 2/2012 | Roering ............. B64D 11/0007 312/236 |
| 2013/0047657 A1* | 2/2013 | Oswald .................. B64D 11/04 62/407 |
| 2013/0269384 A1 | 10/2013 | Burd |
| 2013/0292102 A1 | 11/2013 | Trümper et al. |

FOREIGN PATENT DOCUMENTS

| | | |
|---|---|---|
| EP | 2 650 216 A1 | 10/2013 |
| GB | 1 461 617 A | 1/1977 |
| GB | 2 095 387 | 9/1982 |
| WO | WO 2009/149320 A1 | 12/2009 |
| WO | WO 2012/025200 A1 | 3/2012 |
| WO | WO 2015/003073 A1 | 1/2015 |

OTHER PUBLICATIONS

International Search Report and Written Opinion for Application No. PCT/EP2015/058835 dated Jul. 10, 2015.

* cited by examiner

GALLEY COOLING SYSTEM AND METHOD OF OPERATING A GALLEY COOLING SYSTEM

CROSS-REFERENCE TO RELATED APPLICATIONS

This application is a continuation of and claims priority to PCT/EP2015/058835 filed Apr. 23, 2015 which claims the benefit of and priority to European Patent Application No. 14 165 772.6 filed Apr. 24, 2014, the entire disclosures of which are incorporated by reference herein.

TECHNICAL FIELD

The disclosure herein relates to a galley cooling system suitable for use in an aircraft to cool trolleys containing, for example, food to be supplied to the aircraft passengers and to a method of operating a galley cooling system of this kind.

BACKGROUND

At present, in modern passenger aircraft, meals and beverages to be supplied to the aircraft passengers during flight are stored in trolleys which are accommodated in cooled compartments of galleys until they are delivered by the cabin crew. Two different systems for supplying cooling air to the items to be cooled may be used, which are described, for example, in DE 10 2010 031 909 A1 and WO 2012/025200 A1. So-called air-over systems comprise a heat-insulated cooling chamber sealed against leakages, through which flows cooling air provided by an air chiller or a cooling station of a central cooling system of the aircraft. The trolleys loaded with the items to be cooled can be pushed into the cooling chamber. Trolleys suitable for use in an air-over system are not insulated themselves, but rather have air openings which allow unhindered circulation of cooling air from the cooling chamber through the trolleys and consequently over the items held in the trolleys. By contrast, in so-called air-through systems, the trolleys are connected to the air chiller or the cooling station of the central cooling system via corresponding cooling air connections provided on the trolleys, so that the cooling air provided by the air chiller or the cooling station can be passed directly through the trolleys. To avoid losses of cooling energy, trolleys provided for use in an air-through system must be provided with heat insulation and be sealed against leakages.

A cooling arrangement wherein the air-through principle is combined with an air-over system is described in EP 2 650 216 A1 and US 2013/292102 A2. In the cooling arrangement of EP 2 650 216 A1 and US 2013/292102 A2 a cooling fluid is circulated through a trolley received within a galley compartment via a cooling fluid inlet and a cooling fluid outlet of the trolley. In addition thereto, the galley compartment accommodating the trolley is provided with a cooling air inlet for supplying cooling air to the compartment and a cooling air outlet for discharging the cooling air from the compartment.

SUMMARY

The disclosure herein is directed to an object of providing a galley cooling system suitable for use in an aircraft which allows cooling at least one trolley containing, for example, food to be supplied to the aircraft passengers in an effective manner and which efficiently utilizes the available installation space. Furthermore, the disclosure herein is directed to the object to specify a method of operating a galley cooling system of this kind.

This object is achieved by a galley cooling system having features disclosed herein.

A galley cooling system according to the disclosure herein which is suitable for use in an aircraft, for example, to cool food to be supplied to the aircraft passengers, but also for other purposes comprises a trolley compartment adapted to accommodate at least one trolley which may, for example, be loaded with food or other items which require appropriate cooling. Preferably, the trolley compartment forms a compartment of an aircraft galley which may be arranged in a lower section of the aircraft galley in order to allow a trolley, which typically is equipped with wheels, to be pushed into the compartment in an easy and convenient manner. The trolley compartment comprises a front side access opening and a back wall arranged opposite to the front side access opening. The trolley compartment may further comprise two outer sidewalls, which preferably extend at an angle of approximately 90° relative to the back wall and substantially parallel to each other, and a door for closing the front side access opening. Moreover, the trolley compartment may be sealed against the ambient, for example, by a sealing system described in DE 10 2010 031 909 A1 and WO 2012/025200 A1.

Furthermore, the galley cooling system comprises a cooling unit adapted to provide a cooling fluid. The cooling fluid provided by the cooling unit preferably is ambient air which, upon flowing through a heat exchanger of the cooling unit, is supplied with cooling energy and hence cooled. For example, a refrigerant which is cooled to a temperature of approximately −9° C. may be guided through the heat exchanger of the cooling unit so as to cool the cooling fluid. Preferably, the cooling unit is arranged inside the trolley compartment. It is, however, also conceivable to arrange the cooling unit outside the trolley compartment. In case the cooling unit is installed inside the trolley compartment, the cooling unit is protected from environmental influences. Furthermore, cooling energy losses occurring upon directing the cooling fluid provided by the cooling unit from an installation site outside the trolley compartment into the trolley compartment can be avoided.

The cooling unit comprises a cooling fluid outlet and a cooling fluid inlet. The cooling fluid outlet of the cooling unit may face a floor or a top wall of the trolley compartment. The cooling fluid inlet of the cooling unit may be arranged opposite to the cooling fluid outlet and hence may face the top wall or the flood of the trolley compartment. Furthermore, the cooling unit may be installed in the interior or outside of the trolley compartment with its main surfaces extending substantially parallel to at least one sidewall of the trolley compartment. The cooling unit then can be installed within the trolley compartment in a particularly space saving manner.

A first cooling fluid manifold of the galley cooling system is connected to the cooling fluid outlet or the cooling fluid inlet of the cooling unit. The first cooling fluid manifold receives the cooling fluid exiting the outlet of the cooling unit or directs cooling fluid heated upon circulating through the trolley compartment back to the cooling unit for being cooled again and thereafter being reused for further cooling the trolley compartment. The first cooling fluid manifold has at least one first cooling fluid manifold wall which defines at least a portion of a lateral boundary of a receiving space of the trolley compartment for receiving trolleys. In particular, the first cooling fluid manifold wall may extend substantially parallel to at least one outer sidewall of the trolley compartment.

A first cooling fluid opening is provided in the first cooling fluid manifold wall so as to connect the first cooling fluid manifold to the receiving space of the trolley compartment. Via the first cooling fluid opening, cooling fluid provided by the cooling unit may be supplied to the trolley compartment, or cooling fluid heated upon circulating through the trolley compartment may be discharged from the trolley compartment and directed back to the cooling unit.

The galley cooling system further comprises a second cooling fluid manifold which is connected to the cooling fluid inlet or the cooling fluid outlet of the cooling unit. Thus, in case the first cooling fluid manifold receives the cooling fluid exiting the outlet of the cooling unit, the second cooling fluid manifold directs cooling fluid heated upon circulating through the trolley compartment back to the cooling unit. In case the first cooling fluid manifold directs cooling fluid heated upon circulating through the trolley compartment back to the cooling unit, the second cooling fluid manifold receives the cooling fluid exiting the outlet of the cooling unit. The second cooling fluid manifold has a second cooling fluid manifold wall which defines at least a portion of an upper boundary of the receiving space of the trolley compartment for receiving trolleys. In particular, the second cooling fluid manifold wall may extend substantially parallel to an outer top wall of the trolley compartment.

A second cooling fluid opening is provided in the second cooling fluid manifold wall so as to connect the second cooling fluid manifold to the receiving space of the trolley compartment. Thus, in case the first cooling fluid opening is used for supplying cooling fluid provided by the cooling unit to the trolley compartment, the second cooling fluid opening is used for discharging cooling fluid heated upon circulating through the trolley compartment from the trolley compartment and directing the heated cooling fluid back to the cooling unit. In case the first cooling fluid opening is used for discharging cooling fluid heated upon circulating through the trolley compartment from the trolley compartment and directing the heated cooling fluid back to the cooling unit, the second cooling fluid opening is used for supplying cooling fluid provided by the cooling unit to the trolley compartment. The first and/or the second cooling fluid opening(s) may be designed in the form of a slit or may comprise a plurality of slits or openings distributed across the first and/or the second cooling fluid manifold.

In the galley cooling system, the cooling fluid provided by the cooling unit is supplied the trolley compartment via of a cooling fluid opening which may be arranged in the first cooling fluid manifold wall of the first cooling fluid manifold or in the second cooling fluid manifold wall of the second cooling fluid manifold. Furthermore, cooling fluid heated upon circulating through the trolley compartment is discharged from the trolley compartment and directed back to the cooling unit via a cooling fluid opening which may be arranged in the second cooling fluid manifold wall of the second cooling fluid manifold or in the first cooling fluid manifold wall of the first cooling fluid manifold. Hence, in the galley cooling system, a cooling fluid manifold extending along the back wall of the trolley compartment, i.e. through a rear part of the trolley compartment, as well as a cooling fluid opening arranged in the region of the back wall of the trolley compartment can be dispensed with. This arrangement is particularly advantageous in case the installation space in the region of the back wall of the trolley compartment is limited, for example in case the entire depth of the trolley compartment in the direction of the longitudinal axis of the trolley compartment should be used for accommodating trolleys.

In a preferred embodiment of the galley cooling system, the first cooling fluid manifold is arranged adjacent to a first outer sidewall of the trolley compartment. The receiving space of the trolley compartment, in a lateral direction, then is defined by the first cooling fluid manifold wall and the second outer sidewall of the trolley compartment. Alternatively, the first cooling fluid manifold may be arranged in an interior of the trolley compartment at a distance from the first and the second outer sidewall of the trolley compartment. The first cooling fluid manifold then separates the trolley compartment into a first and a second receiving space. The first cooling fluid manifold wall may extend substantially parallel to the first outer sidewall, in particular substantially parallel to the first and a second outer sidewall and substantially perpendicular to the floor and/or the outer top wall of the trolley compartment.

The first cooling fluid opening may be provided in a region of the first cooling fluid manifold wall which is arranged adjacent to a floor of the trolley compartment, i.e. in the region of a lower limitation of the receiving space of the trolley compartment. Since the second cooling fluid manifold wall defines an upper boundary of the receiving space of the trolley compartment, the second cooling fluid opening is provided in the region of an upper limitation of the receiving space of the trolley compartment anyway. In case the first cooling fluid opening is used to supply cooling fluid to the trolley compartment, whereas cooling fluid heated upon circulating through the trolley compartment is discharged from the trolley compartment via the second cooling fluid opening, cooled cooling fluid provided by the cooling unit may be guided into a lower region of the trolley compartment, whereas cooling fluid which has been heated due to the transfer of thermal energy from a trolley arranged within the trolley compartment is discharged from an upper region of the trolley compartment. The direction of flow of the cooling fluid then may follow a direction of flow induced by thermal convection allowing a conveying device for conveying the cooling fluid through the trolley compartment to be operated in an efficient manner.

The second cooling fluid manifold may be integrated into a work desk of an aircraft galley. In particular, the second cooling fluid manifold may be defined between the second cooling fluid manifold wall defines an upper boundary of the receiving space of the trolley compartment and the outer top wall of the trolley compartment, wherein the assembly comprising the second cooling fluid manifold with the second cooling fluid manifold wall and the outer top wall of the trolley compartment form the work desk of the aircraft galley, and wherein an outer surface of the outer top wall of the trolley compartment defines a working surface of the work desk. A second cooling fluid manifold which is integrated into a work desk of an aircraft galley can be designed in a space saving manner, in particularly without using installation space in the region of the back wall of the trolley compartment.

The second cooling fluid manifold may be connected to the cooling fluid inlet or the cooling fluid outlet of the cooling unit via a connecting manifold having a connecting manifold wall defining at least a portion of the lateral boundary of the trolley compartment. In particular, the connecting manifold wall may extend substantially parallel to at least one of the outer sidewalls of the trolley compartment, and substantially perpendicular to the floor and/or the outer top wall of the trolley compartment.

In a preferred embodiment of the galley cooling system, the connecting manifold is arranged adjacent to the first outer sidewall of the trolley compartment. The receiving space of the trolley compartment, in a lateral direction, then is defined by the connecting manifold wall, preferably together with the first cooling fluid manifold, and the second outer sidewall of the trolley compartment. Alternatively, the connecting manifold may be arranged in an interior of the trolley compartment at a distance from the first and the second outer sidewall of the trolley compartment. The connecting manifold, preferably together with the first cooling fluid manifold, then separates the trolley compartment into the first and the second receiving space. For example, the connecting manifold may separate upper regions of the first and the second receiving space of the trolley compartment which are disposed adjacent to the top wall of the trolley compartment, whereas the first cooling fluid manifold may separate lower regions of the first and the second receiving space of the trolley compartment which are disposed adjacent to the floor of the trolley compartment.

The galley cooling system may comprise a control unit, in particular an electronic control unit, for controlling the supply of cooling fluid to the trolley compartment. For example, the control unit may be adapted to control a conveying device for conveying the cooling fluid through the trolley compartment, wherein the conveying device may be designed in the form of a blower or fan. Furthermore, the control unit may be adapted to control further flow guiding elements such as, for example, valves or movable flow deflecting elements.

The trolley compartment may in particular be designed so as to receive a plurality of trolleys arranged one behind another in a row with their sidewalls extending substantially parallel to the sidewalls of the trolley compartment. The trolley compartment then is particularly suitable for use in the galley of a modern passenger aircraft, wherein the crew faces increased catering volumes due to the large number of passengers on board the aircraft. For example, the trolley compartment may be designed so as to receive three standard half-sized trolleys arranged in a row one behind another. Alternatively or additionally thereto, the trolley compartment may be designed so as to receive a plurality of trolleys arranged side by side with their sidewalls extending substantially parallel to the sidewalls of the trolley compartment. In a preferred embodiment of the galley cooling system, the trolley compartment is designed so as to receive four rows of standard half-sized trolleys in a side by side arrangement, wherein the sidewalls of the trolleys extend substantially parallel to the sidewalls of the trolley compartment.

The cooling unit of the galley cooling system may be designed in the form of an autonomously working air chiller. Preferably, however, the cooling unit is designed in the form of a cooling station which is connected to a central refrigerating device of a central cooling system of the aircraft, for example via a suitable cooling circuit which allows the circulation of a liquid refrigerant therethrough. The cooling unit then may be of a particularly compact design. Furthermore, noise occurring during operation of an air chiller can be avoided.

The cooling unit may be arranged inside the trolley compartment adjacent to the first cooling fluid manifold. In particular, the cooling unit may be arranged between the first cooling fluid manifold and the connecting manifold. The first cooling fluid manifold wall and/or the connecting manifold wall may extend substantially flush with a main surface of the cooling unit.

The first cooling fluid manifold may comprise two first cooling fluid manifold walls facing the first and the second outer sidewall of the trolley compartment, respectively. A first cooling fluid opening may be provided in each of the first cooling fluid manifold walls so as to connect the first cooling fluid manifold to the first and the second receiving space of the trolley compartment, respectively. The second cooling fluid manifold may comprise a first portion associated with the first receiving space of the trolley compartment and a second portion associated with the second receiving space of the trolley compartment. A second cooling fluid opening may be provided in each of second cooling fluid manifold wall portions associated with the first and the second portion of the second cooling fluid manifold so as to connect the second cooling fluid manifold to the first and the second receiving space of the trolley compartment, respectively.

In a method, according to the disclosure herein, of operating a galley cooling system suitable for use in an aircraft, a cooling fluid is provided to a trolley compartment by a cooling unit, the trolley compartment comprising a front side access opening and a back wall arranged opposite to the front side access opening. The cooling unit comprises a cooling fluid outlet and a cooling fluid inlet. The cooling fluid is directed through a first cooling fluid manifold connected to the cooling fluid outlet or the cooling fluid inlet of the cooling unit and having at least one first cooling fluid manifold wall defining at least a portion of a lateral boundary of a receiving space of the trolley compartment. A first cooling fluid opening is provided in the first cooling fluid manifold wall so as to connect the first cooling fluid manifold to the receiving space of the trolley compartment. Furthermore, the cooling fluid is directed through a second cooling fluid manifold connected to the cooling fluid inlet or the cooling fluid outlet of the cooling unit and having a second cooling fluid manifold wall defining at least a portion of an upper boundary of a receiving space of the trolley compartment. A second cooling fluid opening is provided in the second cooling fluid manifold wall so as to connect the second cooling fluid manifold to the receiving space of the trolley compartment.

Cooling fluid may be directed through a first cooling fluid manifold arranged adjacent to a first outer sidewall of the trolley compartment. Alternatively, cooling fluid may be directed through a first cooling fluid manifold arranged in an interior of the trolley compartment at a distance from the first and a second outer sidewall of the trolley compartment. The first cooling fluid manifold may be connected to the receiving space of the trolley compartment via a first cooling fluid opening provided in a region of the first cooling manifold wall which is arranged adjacent to a floor of the trolley compartment. The cooling fluid may also be directed through a second cooling fluid manifold which is integrated into a work desk of an aircraft galley.

The cooling fluid may be directed through a connecting manifold connecting the second cooling fluid manifold to the cooling fluid inlet or the cooling fluid outlet of the cooling unit. The connecting manifold may have a connecting manifold wall defining at least a portion of the lateral boundary of the receiving space of the trolley compartment. The connecting manifold may be arranged adjacent to the first outer sidewall of the trolley compartment in an interior of the trolley compartment at a distance from the first and a second outer sidewall of the trolley compartment.

The cooling fluid may be provided by a cooling unit designed in the form of a cooling station which is connectable to a central refrigerating device of a central cooling system of the aircraft. The cooling fluid may be provided by a cooling unit arranged inside the trolley compartment adjacent to the first cooling fluid manifold and in particular between the first cooling fluid manifold and the connecting manifold.

The cooling fluid may be directed through a first cooling fluid manifold comprising two first cooling fluid manifold walls facing the first and the second outer sidewall of the trolley compartment respectively, wherein a first cooling fluid opening may be provided in each of the first cooling fluid manifold walls so as to connect the first cooling fluid manifold to a first and a second receiving space of the trolley compartment, respectively. The cooling fluid may be directed through a second cooling fluid manifold comprising a first portion associated with the first receiving space of the trolley compartment and a second portion associated with the second receiving space of the trolley compartment. A second cooling fluid opening may be provided in each of second cooling fluid manifold wall portions associated with the first and the second portion of the second cooling fluid manifold so as to connect the second cooling fluid manifold to the first and the second receiving space of the trolley compartment, respectively.

BRIEF DESCRIPTION OF THE DRAWINGS

Preferred embodiments of the disclosure herein will now be explained in more detail with reference to the appended schematic drawings, wherein.

DETAILED DESCRIPTION

Figure 1:
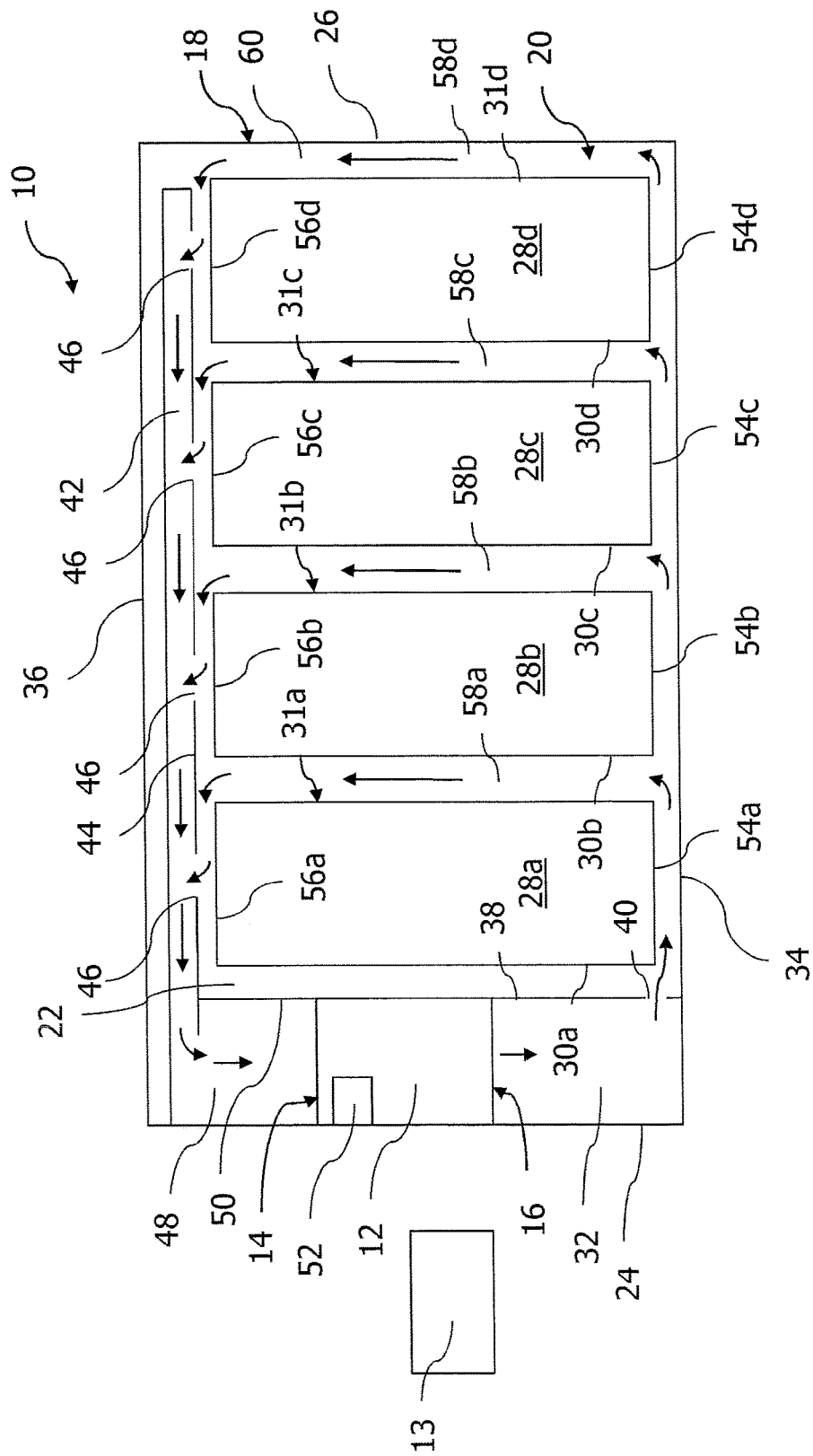
FIG. 1 is a front view of a first embodiment of a galley cooling system suitable for use on board an aircraft for cooling food to be supplied to the aircraft passengers.

FIG. 1 shows a galley cooling system 10 suitable for use in an aircraft galley. The galley cooling system 10 comprises a cooling unit 12 which is adapted to provide a cooling fluid. The cooling unit 12 is designed in the form of a cooling station which is connected to a central refrigerating device 13 of a central cooling system of the aircraft via a suitable cooling circuit (not shown) allowing the circulation of a liquid refrigerant therethrough. The cooling unit 12 is adapted to provide a cooling fluid in the form of cooled ambient air. In particular, ambient air enters the cooling unit 12 via a cooling unit inlet 14 and, in the cooling unit 12, is guided through a heat exchanger (not shown). Upon flowing through the heat exchanger of the cooling unit 12, the ambient air is cooled and exits the cooling unit 12 at a cooling unit outlet 16 with a desired low temperature.

The galley cooling system 10 further comprises a trolley compartment 18. The trolley compartment 18 comprises a front side access opening 20, a back wall 22 which is arranged opposite to the front side access opening 20 and two outer sidewalls 24, 26. The outer sidewalls 24, 26 of the trolley compartment 18 extend substantially parallel to each other and substantially perpendicular to the back wall 22. The trolley compartment 18 further comprises a door (not shown) which is adapted to close the front side access opening 20 of the trolley compartment 18 in a sealed manner.

The trolley compartment 18 is designed so as to receive twelve half-sized trolleys 28a, 28b, 28c, 28d. Three trolleys 28a are arranged one behind another in a first row with their sidewalls 30a, 31a extending substantially parallel to the outer sidewalls 24, 26 of the trolley compartment 18. Moreover, three trolleys 28b are arranged one behind another in a second row with their sidewalls 30b, 31b extending substantially parallel to the outer sidewalls 24, 26 of the trolley compartment 18. Three trolleys 28c are arranged one behind another in a third row with their sidewalls 30c, 31c extending substantially parallel to the outer sidewalls 24, 26 of the trolley compartment 18, and three trolleys 28d are arranged one behind another in a fourth row with their sidewalls 30d, 31d extending substantially parallel to the outer sidewalls 24, 26 of the trolley compartment 18.

In the embodiment of a galley cooling system 10 according to FIG. 1, a first cooling fluid manifold 32 is connected to the cooling fluid outlet 16 of the cooling unit 12. The first cooling fluid manifold 32 extends adjacent to the first outer sidewall 24 of the trolley compartment 18 substantially perpendicular to a floor 34 and a outer top wall 36 of the trolley compartment 18 and has a first cooling fluid manifold wall 38 defining a portion of a lateral boundary of a receiving space 60 of the trolley compartment 18, the receiving space 60 being adapted for accommodating the trolleys 28a, 28b, 28c, 28d. Specifically, the first cooling fluid manifold wall 38 extends substantially parallel to the first outer sidewall 24 of the trolley compartment 18. Hence, the first cooling fluid manifold 32 is defined by the first cooling fluid manifold wall 38 and the first outer sidewall 24 of the trolley compartment 18. Since the first and the second outer sidewall 24, 26 extend substantially parallel to each other, the first cooling fluid manifold wall 38 extends substantially parallel also to the second outer sidewall 24 of the trolley compartment 18. Specifically, the first cooling fluid manifold wall 38 extends flush with a main surface of the cooling unit 12 facing an interior of the trolley compartment 18. In the embodiment of a galley cooling system 10 depicted in the drawings, the first cooling fluid manifold 32 extends from the cooling fluid outlet 16 of the cooling unit 12 in the direction of the floor 34 of the trolley compartment 18.

A first cooling fluid opening 40 is provided in the first cooling fluid manifold wall 38 so as to connect the first cooling fluid manifold 32 to the receiving space 60 of the trolley compartment 18. In the embodiment of a galley cooling system 10 according to FIG. 1, the first cooling fluid opening 40 serves to supply cooling fluid provided by the cooling unit 12 to the receiving space 60 of the trolley compartment 18. In particular, the first cooling fluid opening 40 is provided in a lower region of the first cooling fluid manifold wall 38, i.e. a region of the first cooling fluid manifold wall 38 which is arranged adjacent to the floor 34 of the trolley compartment 18, and extends over at least two thirds of the depth of the trolley compartment 18.

The galley cooling system 10 further comprises a second cooling fluid manifold 42 which, in the embodiment of a galley cooling system 10 according to FIG. 1, is connected to the cooling fluid inlet 14 of the cooling unit 12. The second cooling fluid manifold 42 has a second cooling fluid manifold wall 44 defining an upper boundary of the receiving space 60 of the trolley compartment 18. A second cooling fluid opening 46 is provided so as to connect the second cooling fluid manifold 42 to the receiving space 60 of the trolley compartment 18. Specifically, the second cooling fluid opening 46 is defined by a plurality of slit-shaped openings formed in the second cooling fluid manifold wall 44. In the embodiment of a galley cooling system 10 according to FIG. 1, the second cooling fluid opening 46 serves to discharge cooling fluid provided by the cooling unit 12 to the receiving space 60 of the trolley compartment 18. Thus, cooling fluid heated upon flowing through the trolley compartment 18 and taking up heat from the trolleys 28a, 28b, 28c, 28d received within the trolley compartment 18 is circulated back to the cooling unit 12 via the second cooling fluid manifold 42.

The second cooling fluid manifold 42 extends substantially parallel to the outer top wall 36 of the trolley compartment 18 with the second cooling fluid opening 46 facing the interior of the trolley compartment 18. Thus, the second cooling fluid opening 46 is provided in an upper region of the receiving space 60 of the trolley compartment 18. In particular, the second cooling fluid manifold 42 is integrated into a work desk of the aircraft galley with the second cooling fluid manifold wall 44 separating the second cooling fluid manifold 42 from the interior of the trolley compartment 18 and an inner surface of the outer top wall 36 of the trolley compartment 18 forming an upper limitation of the second cooling fluid manifold 42. An outer surface of the outer top wall 36 of the trolley compartment 18 defines a working surface of the work desk.

The second cooling fluid manifold 42 is connected to the cooling fluid inlet 14 of the cooling unit 12 via a connecting manifold 48. The connecting manifold 48 comprises a connecting manifold wall 50 which defines a portion of the lateral boundary of the receiving space 60 of the trolley compartment 18. The connecting manifold 48 is arranged adjacent to the first outer sidewall 24 of the trolley compartment 18 and the connecting manifold wall 50 extends substantially parallel to the first outer sidewall 24 of the trolley compartment 18. Hence, the connecting manifold 48 is defined by the connecting manifold wall 50 and the first outer sidewall 24 of the trolley compartment. Since the first and the second outer sidewall 24, 26 extend substantially parallel to each other, the connecting manifold wall 38 extends substantially parallel also to the second outer sidewall 24 of the trolley compartment 18. Specifically, the connecting manifold wall 50 extends flush with the main surface of the cooling unit 12 facing the interior of the trolley compartment 18 from the cooling fluid inlet 14 of the cooling unit 12 in the direction of the outer top wall 36 to the second cooling fluid manifold 42.

The cooling unit 12 is arranged inside the trolley compartment 18 adjacent to the first outer sidewall 24 of the trolley compartment 18 and between the first cooling fluid manifold 32 and the connecting manifold 48. Alternatively, it is also possible to arrange the cooling unit 12, the first cooling fluid manifold 32 and the connecting manifold 48 inside the trolley compartment 18 adjacent to the second outer sidewall 26 of the trolley compartment 18. Finally, the galley cooling system 10 may comprise two cooling units 12, two first cooling fluid manifolds 32 and two connecting manifolds 48, wherein an assembly comprising a cooling unit 12, a first cooling fluid manifold 32 and a connecting manifold 48 may be arranged adjacent to a respective one of the first and the second outer sidewall 24, 26.

In the galley cooling system 10 according to FIG. 1, the cooling unit 12, the first cooling fluid manifold 32 and the connecting manifold 48 are installed adjacent to the first outer sidewall 24 of the trolley compartment 18 and the second cooling fluid manifold 42 is arranged adjacent to the outer top wall 36 of the trolley compartment 18. As a result, the entire depth of the trolley compartment 18 can be used for accommodating the trolleys 28a, 28b, 28c, 28d. The galley cooling system 10 therefore is particularly advantageous for use on board a passenger aircraft with high catering demands, for example due to a high number of passengers being present on board the aircraft.

The flow of cooling fluid through the trolley compartment 18 is controlled by a control unit 52. In particular, the control unit 52 serves to control the operation of a conveying device (not shown) for conveying the cooling fluid through the trolley compartment 18. The conveying device maybe designed in the form of a blower of a fan. Furthermore, the control unit 52 may be used to control further devices for controlling the flow of the cooling fluid through the trolley compartment 18 such as, for example, valves, flow deflecting elements and the like.

As becomes apparent from FIG. 1, the control unit 52 controls a volume flow, a speed and a direction of flow of the cooling fluid supplied to the trolley compartment 18 from the cooling unit 12 in such a manner that the cooling fluid entering the trolley compartment 18 via the first cooling fluid opening 40 is guided through a lower region of the trolley compartment 18 in the direction of the second outer sidewall 26 of the trolley compartment 18. Upon reaching the second outer sidewall 26, the cooling fluid flow is deflected about approximately 90° and flows across an inner surface of the second outer sidewall 26 of the trolley compartment 18. Thereafter, it is again deflected about approximately 90° and flows across an inner surface of the second cooling fluid manifold wall 44 which faces the interior of the trolley compartment 18 in the direction of the second cooling fluid opening 46 provided in the second cooling fluid manifold wall 44.

Hence, when trolleys 28a, 28b, 28c, 28d are accommodated within the trolley compartment 18, the cooling fluid is guided across an outer surface of bottom walls 54a, 54b, 54c, 54d of the trolleys 28a, 28b, 28, 28c, 28d. Thereafter, the cooling fluid is guided across an outer surface of the sidewalls 31a, 31b, 31c, 31d of the trolleys 28a, 28b, 28c, 28d which face away from the first outer sidewall 24 of the trolley compartment 18. Finally, the cooling fluid is guided across an outer surface of top walls 56a, 56b, 56c, 56d of the trolleys 28a, 28b, 28c, 28d.

As becomes apparent from FIG. 1, the flow of cooling fluid, under the control of the control unit 52, after flowing across the outer surface of the bottom wall 54a of the trolleys 28a arranged adjacent to the first cooling fluid opening 40 is divided into a first partial flow and a second partial flow. The first partial flow of the cooling fluid is guided is through a gap 58a existing between the trolleys 28a, 28b such that the first partial flow of the cooling fluid flows across adjacent sidewalls 31a, 30b of the trolleys 28a, 28b. After passing through the gap 58a between the adjacent trolleys 28a, 28b, the first partial flow of the cooling fluid is guided across the outer surface of the top wall 54a of the trolleys 28a arranged adjacent to the first cooling fluid opening 40 and finally enters the second cooling fluid opening 46. The second partial flow flows across the outer surface of the bottom wall 52b of the trolleys 28b. After passing the outer surface of the bottom wall 52b of the trolleys 28b, a third partial flow of cooling fluid branches of from the second partial flow of cooling fluid and flows through a gap 58b existing between the trolleys 28b, 28c such that the third partial flow of the cooling fluid flows across adjacent sidewalls 31b, 30c of the trolleys 28b, 28c.

After passing through the gap 58b between the adjacent trolleys 28b, 28c, the third partial flow of the cooling fluid is guided across the outer surface of the top wall 54b of the trolleys 28b and finally enters the second cooling fluid opening 46.

The second partial flow flows further across the outer surface of the bottom wall 52c of the trolleys 28c. After passing the outer surface of the bottom wall 52c of the trolleys 28c, a fourth partial flow of cooling fluid branches of from the second partial flow of cooling fluid and flows through a gap 58c existing between the trolleys 28c, 28d such that the fourth partial flow of the cooling fluid flows across adjacent sidewalls 31c, 30d of the trolleys 28c, 28d. After passing through the gap 58c between the adjacent trolleys 28c, 28d, the third partial flow of the cooling fluid is guided across the outer surface of the top wall 54c of the trolleys 28c and finally enters the second cooling fluid opening 46. Finally, the second partial flow flows across the outer surface of the bottom wall 52d of the trolleys 28d and thereafter enters a gap 58d existing between the sidewall 31d of the trolleys 28d and the second outer sidewall 26 of the trolley compartment 18. After passing the gap 58d, the second partial flow flows across the outer surface of the top wall 54d of the trolleys 28d before it is discharged from the trolley compartment 18 via the second cooling fluid opening 46.

Although not indicated in the drawings, a further partial flow of the cooling fluid develops in the region between the first cooling fluid manifold wall 38 and the sidewalls 30a of the trolleys 28a, although this partial flow might be disturbed to a certain extent by the supply of cooling fluid via the cooling supply opening 40 and the discharge of cooling fluid via the second cooling fluid opening 46. In addition, cooling fluid flows develop between the door of the trolley compartment 18 and a front wall of the trolleys 28a, 28b, 28c, 28d arranged adjacent to the door as well as between the trolleys 28a, 28b, 28c, 28d arranged in row one behind the other, i.e. between a back wall of a trolley 28a, 28b, 28c, 28d arranged closer to the trolley compartment door and a front wall of a trolley 28a, 28b, 28c, 28d arranged further remote from the trolley compartment door. Finally, cooling fluid also flows through a gap existing between back walls of trolleys 28a, 28b, 28c, 28d and a back wall of the trolley compartment 18.

Figure 2:
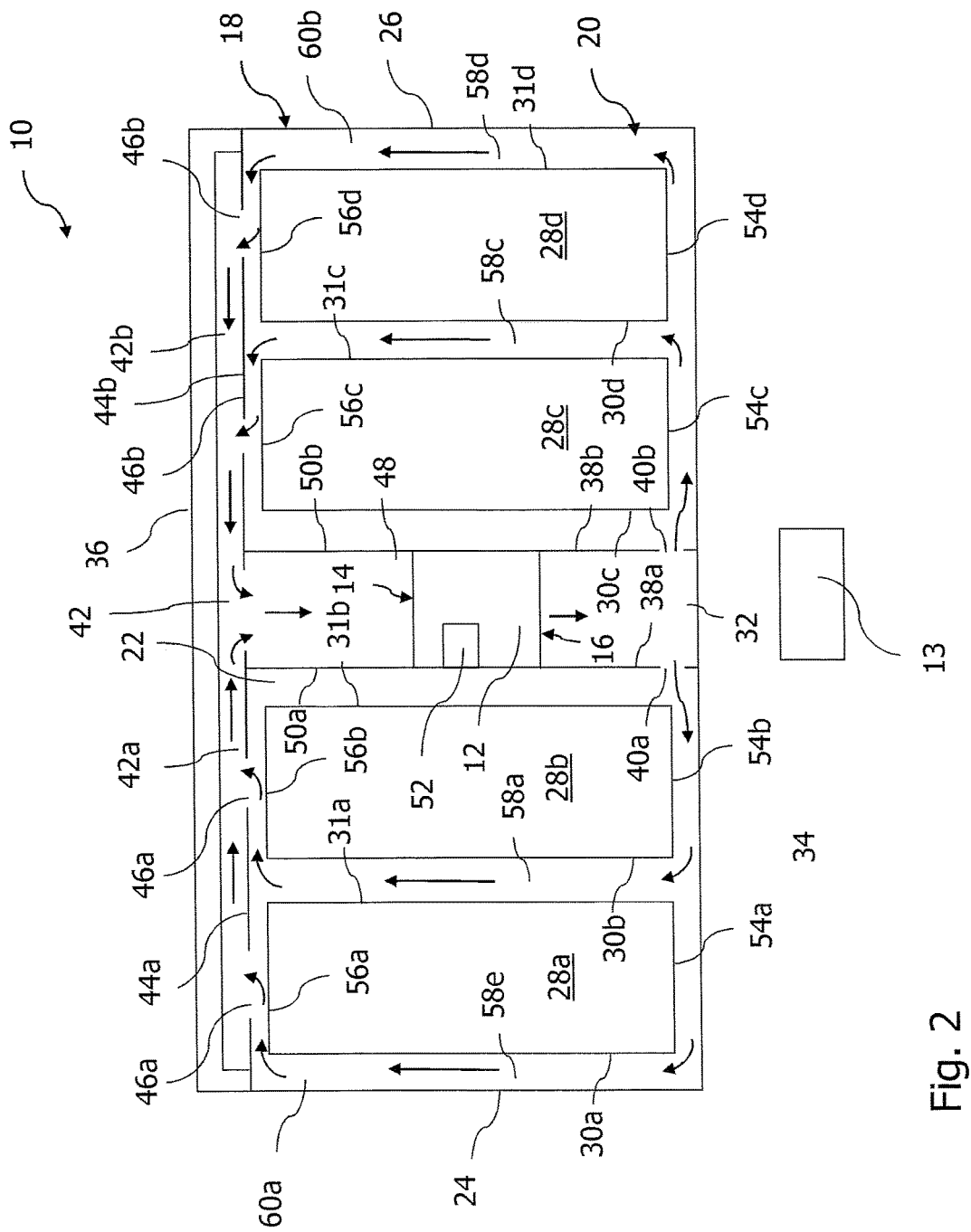
FIG. 2 is a front view of a second embodiment of a galley cooling system suitable for use on board an aircraft for cooling food to be supplied to the aircraft passengers.

The galley cooling system 10 depicted in FIG. 2 differs from the arrangement according to FIG. 1 in that the cooling unit 12 and the first cooling fluid manifold 32 are no longer arranged adjacent to one of the sidewalls 24, 26 of the trolley compartment 18, but instead are arranged in the interior of the trolley compartment 18 at a distance from the first and the second outer sidewall 24, 26, i.e. in such a manner that the cooling unit 12 and the first cooling fluid manifold 32 separate a first and a second receiving space 60a, 60b provided in the trolley compartment 18 for receiving the trolleys 28a, 28b, 28c, 28d. In particular, the first cooling fluid manifold 32 comprises a first cooling fluid manifold wall 38a facing the first outer sidewall 24 of the trolley compartment 18 and a further first cooling fluid manifold wall 38b facing the second outer sidewall 26 of the trolley compartment 18. A first cooling fluid opening 40a is provided in the first cooling fluid manifold wall 38a. Via the first cooling fluid opening 40a, cooling fluid provided by the cooling unit 12 is supplied to the first receiving space 60a of the trolley compartment 18. Moreover, a further first cooling fluid opening 40b is provided in the further first cooling fluid manifold wall 38b. Via the further first cooling fluid opening 40b, cooling fluid provided by the cooling unit 12 is supplied to the second receiving space 60b of the trolley compartment 18.

The second cooling fluid manifold 42 comprises a first portion 42a associated with the first receiving space 60a of the trolley compartment 18 and a second portion 42b associated with the second receiving space 60b of the trolley compartment 18. A second cooling fluid opening 46a is provided in a second cooling fluid manifold wall portion 44a associated with the first portion 42a of the second cooling fluid manifold 42 so that cooling fluid heated upon circulating through the first receiving space 60a of the trolley compartment 18 can be discharged from the first receiving space 60a of the trolley compartment 18 via the second cooling fluid opening 46a. A further second cooling fluid opening 46b is provided in a second cooling fluid manifold wall portion 44b associated with the second portion 42b of the second cooling fluid manifold 42. Hence, cooling fluid heated upon circulating through the second receiving space 60b of the trolley compartment 18 can be discharged from the second receiving space 60b of the trolley compartment 18 via the further second cooling fluid opening 46b. In the upper region of the trolley compartment 18 adjacent to the trolley compartment's 18 outer top wall 36, the first and the second receiving space 60a, 60b, i.e. upper regions thereof which are disposed adjacent to the second cooling fluid manifold 42 are separated from each other by the connecting manifold 48. Thus, similar to the first cooling fluid manifold 32, also the connecting manifold 48 now comprises a first connecting manifold wall 50a which faces the first outer sidewall 24 of the trolley compartment 18 and a second connecting manifold wall 50b which faces the second outer sidewall 26 of the trolley compartment 18.

Under the control of the control unit 52, a first flow of cooling fluid exits the first cooling fluid opening 40a and flows through a lower region of the trolley compartment 18 in the direction of the first outer sidewall 24. After flowing across the outer surface of the bottom wall 54b of the trolleys 28b arranged adjacent to the first cooling fluid opening 40a, the flow of cooling fluid is divided into a first partial flow and a second partial flow. The first partial flow of the cooling fluid is guided is through the gap 58a existing between the trolleys 28a, 28b such that the first partial flow of the cooling fluid flows across adjacent sidewalls 31a, 30b of the trolleys 28a, 28b. After passing through the gap 58a between the adjacent trolleys 28a, 28b, the first partial flow of the cooling fluid is guided across the outer surface of the top wall 54b of the trolleys 28b arranged adjacent to the first cooling fluid opening 40a and finally enters the second cooling fluid opening 46a.

The second partial flow flows across the outer surface of the bottom wall 52a of the trolleys 28a. After passing the outer surface of the bottom wall 52a of the trolleys 28a, the second partial flow flows enters a gap 58e existing between the sidewall 30a of the trolleys 28a and the first outer sidewall 24 of the trolley compartment 18. After passing the gap 58e, the second partial flow flows across the outer surface of the top wall 54a of the trolleys 28a before it is discharged from the trolley compartment 18 via the second cooling fluid opening 46a.

To the contrary, a second flow of cooling fluid exits the further first cooling fluid opening 40b and flows through a lower region of the trolley compartment 18 in the direction of the second outer sidewall 26. After flowing across the outer surface of the bottom wall 54c of the trolleys 28c arranged adjacent to the further first cooling fluid opening 40b, the flow of cooling fluid is divided into a first partial flow and a second partial flow. The first partial flow of the cooling fluid is guided is through the gap 58c existing between the trolleys 28c, 28d such that the first partial flow of the cooling fluid flows across adjacent sidewalls 31c, 30d of the trolleys 28c, 28d. After passing through the gap 58c between the adjacent trolleys 28c, 28d, the first partial flow of the cooling fluid is guided across the outer surface of the top wall 54c of the trolleys 28c arranged adjacent to the further first cooling fluid opening 40b and finally enters the further second cooling fluid opening 46b.

The second partial flow flows across the outer surface of the bottom wall 52d of the trolleys 28d. After passing the outer surface of the bottom wall 52d of the trolleys 28d, the second partial flow flows enters the gap 58d existing between the sidewall 31d of the trolleys 28d and the second outer sidewall 26 of the trolley compartment 18. After passing the gap 58d, the second partial flow flows across the outer surface of the top wall 54d of the trolleys 28d before it is discharged from the trolley compartment 18 via the further second cooling fluid opening 46b. Otherwise the structure and the function of the galley cooling system 10 according to FIG. 2 correspond to the structure and the function of the arrangement shown in FIG. 1.

Figure 3:
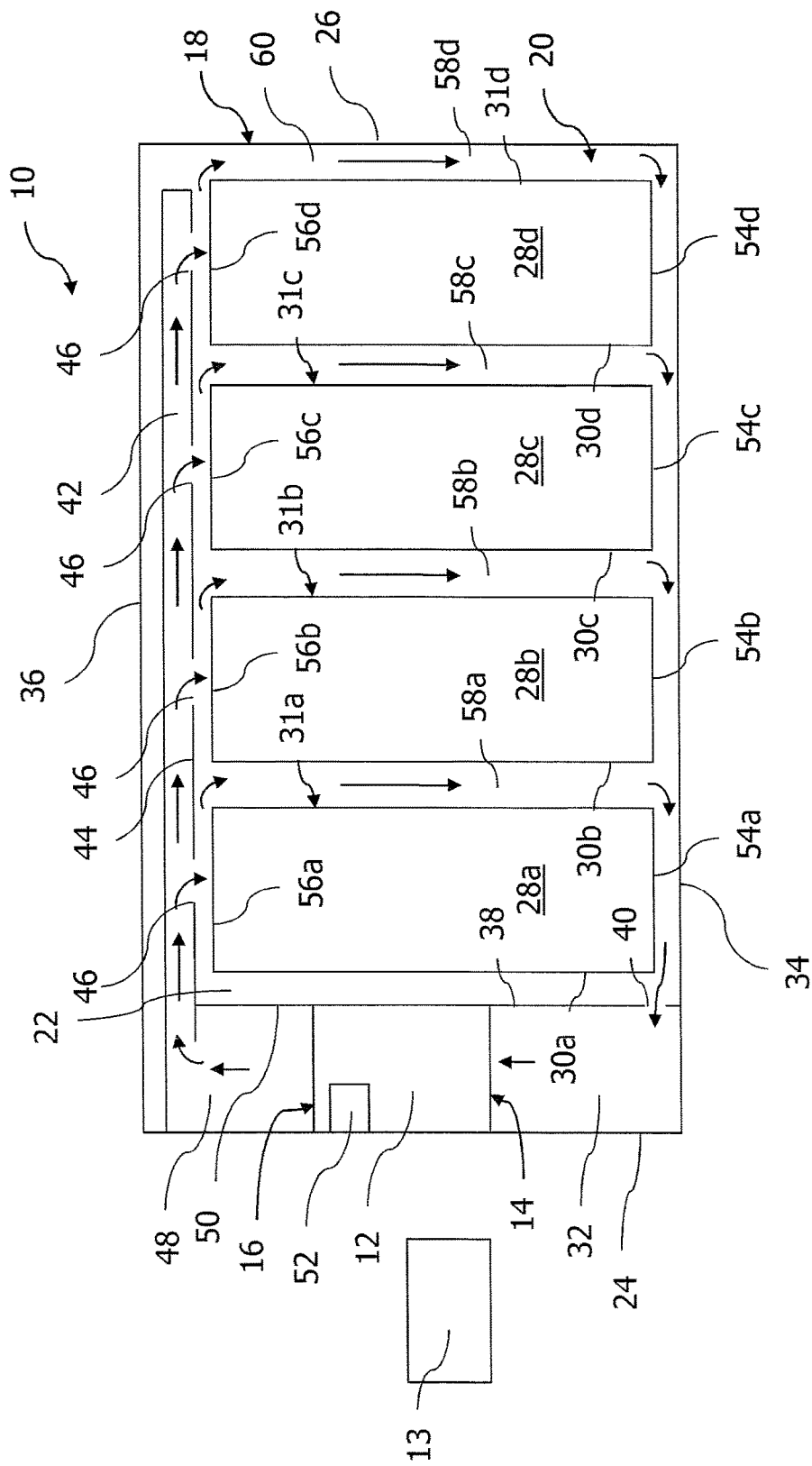
FIG. 3 is a front view of a third embodiment of a galley cooling system suitable for use on board an aircraft for cooling food to be supplied to the aircraft passengers.

The galley cooling system 10 depicted in FIG. 3 differs from the arrangement according to FIG. 1 in that the first cooling fluid manifold 32 now is connected to the cooling fluid inlet 14 of the cooling unit 12, whereas the second cooling fluid manifold 42 is connected to the cooling fluid outlet 16 of the cooling unit 12. Thus, in the arrangement of FIG. 3, the second cooling fluid opening 46 provided in the second cooling fluid manifold wall 44 is used for supplying cooling fluid provided by the cooling unit 12 to the receiving space 60 of the trolley compartment 18. Cooling fluid heated upon circulating through the trolley compartment 18 is discharged from the receiving space 60 of the trolley compartment 18 via the first cooling fluid opening 40 provided in the first cooling fluid manifold wall 38.

As a result, in the galley cooling system 10 depicted in FIG. 3, the direction of flow of the cooling fluid through the trolley compartment 18 is reversed as compared to the direction of flow of the cooling fluid through the trolley compartment 18 in the galley cooling system 10 depicted in FIG. 1. Otherwise the structure and the function of the galley cooling system 10 according to FIG. 3 correspond to the structure and the function of the arrangement shown in FIG. 1.

Figure 4:
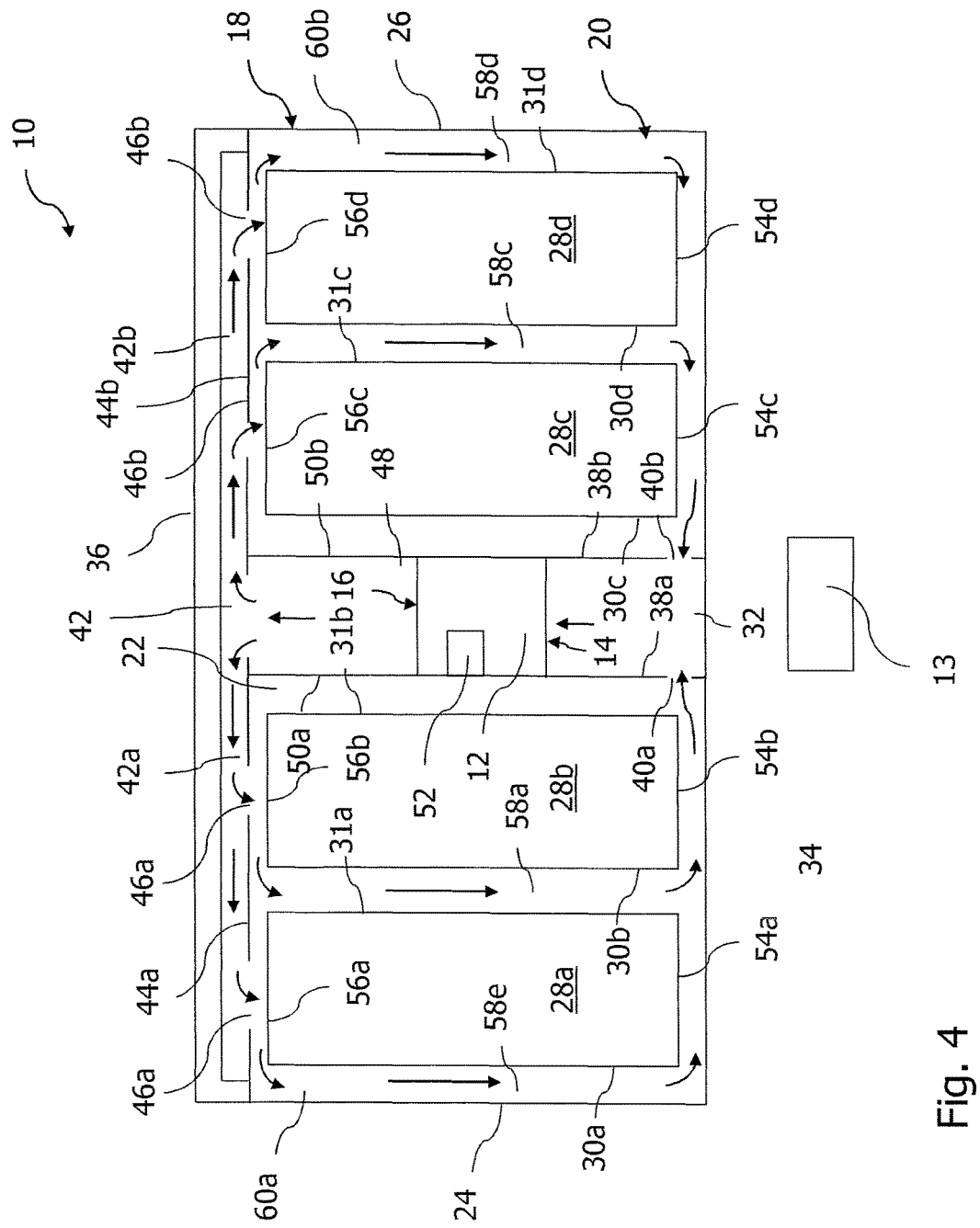
FIG. 4 is a front view of a fourth embodiment of a galley cooling system suitable for use on board an aircraft for cooling food to be supplied to the aircraft passengers.

The galley cooling system 10 depicted in FIG. 4 differs from the arrangement according to FIG. 2 in that the first cooling fluid manifold 32 now is connected to the cooling fluid inlet 14 of the cooling unit 12, whereas the second cooling fluid manifold 42 is connected to the cooling fluid outlet 16 of the cooling unit 12. Thus, in the arrangement of FIG. 4, the second cooling fluid opening 46 provided in the second cooling fluid manifold wall 44 is used for supplying cooling fluid provided by the cooling unit 12 to the receiving space 60 of the trolley compartment 18. Cooling fluid heated upon circulating through the trolley compartment 18 is discharged from the receiving space 60 of the trolley compartment 18 via the first cooling fluid opening 40 provided in the first cooling fluid manifold wall 38.

As a result, in the galley cooling system 10 depicted in FIG. 4, the direction of flow of the cooling fluid through the trolley compartment 18 is reversed as compared to the direction of flow of the cooling fluid through the trolley compartment 18 in the galley cooling system 10 depicted in FIG. 2. Otherwise the structure and the function of the galley cooling system 10 according to FIG. 4 correspond to the structure and the function of the arrangement shown in FIG. 2.

While specific features of the galley cooling system 10 herein have been described with reference to specific embodiments of the galley cooling system 10, these features can be combined as desired.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A galley cooling system for an aircraft, the galley cooling system comprising:
   a trolley compartment comprising a front side access opening and a back wall arranged opposite to the front side access opening;
   a cooling unit for providing a cooling fluid and comprising a cooling fluid outlet and a cooling fluid inlet;
   a first cooling fluid manifold connected to the cooling fluid outlet or the cooling fluid inlet of the cooling unit, wherein the first cooling fluid manifold has at least one first cooling fluid manifold wall defining at least a portion of a lateral boundary of a receiving space of the trolley compartment, wherein the at least one first cooling fluid manifold wall extends in a direction between the front side access opening and the back wall of the trolley compartment approximately perpendicular to the back wall of the trolley compartment, and wherein the first cooling fluid manifold wall comprises a first cooling fluid opening to connect the first cooling fluid manifold to the receiving space of the trolley compartment; and
   a second cooling fluid manifold connected to the cooling fluid inlet or the cooling fluid outlet of the cooling unit, the second cooling fluid manifold having a second cooling fluid manifold wall defining at least a portion of an upper boundary of the receiving space of the trolley compartment, wherein the second cooling fluid manifold wall comprises a second cooling fluid opening to connect the second cooling fluid manifold to the receiving space of the trolley compartment,
   wherein the cooling unit is arranged inside the trolley compartment, outside of the lateral boundary of the receiving space of the trolley compartment defined by the at least one first cooling fluid manifold wall.

2. The galley cooling system according to claim 1, wherein the first cooling fluid manifold is arranged adjacent to a first outer sidewall of the trolley compartment or wherein the first cooling fluid manifold is arranged in an interior of the trolley compartment at a distance from a first outer sidewall and a second outer sidewall of the trolley compartment.

3. The galley cooling system according to claim 1, wherein the first cooling fluid opening is located in a region of the first cooling manifold wall adjacent to a floor of the trolley compartment.

4. The galley cooling system according to claim 1, wherein the trolley compartment comprises an outer top wall extending substantially parallel to the second cooling fluid manifold, wherein an outer surface of the outer top wall defines a work desk of an aircraft galley.

5. The galley cooling system according to claim 1, wherein the trolley compartment is configured to receive a plurality of trolleys arranged one behind another, relative to a front and/or rear of each of the plurality of trolleys, in a row with sidewalls of the trolleys extending substantially parallel to sidewalls of the trolley compartment, such that a rear of a front trolley is adjacent a front of an adjacent trolley.

6. The galley cooling system according to claim 1, wherein the trolley compartment is designed to receive a plurality of trolleys arranged side by side with sidewalls of the trolleys extending substantially parallel to sidewalls of the trolley compartment.

7. The galley cooling system according to claim 1, wherein the cooling unit is configured as a cooling station which is connectable to a central refrigerating device of a central cooling system of the aircraft.

8. The galley cooling system according to claim 1, wherein the second cooling fluid manifold is connected to the cooling fluid inlet or the cooling fluid outlet of the cooling unit via a connecting manifold comprising a connecting manifold wall that defines at least a portion of the lateral boundary of the receiving space of the trolley compartment.

9. The galley cooling system according to claim 8, wherein the connecting manifold is adjacent to a first outer sidewall of the trolley compartment or wherein the connecting manifold is arranged in an interior of the trolley compartment at a distance from the first outer sidewall and a second outer sidewall of the trolley compartment.

10. The galley cooling system according to claim 8, wherein the cooling unit is arranged between the first cooling fluid manifold and the connecting manifold.

11. The galley cooling system according to claim 10, wherein the first cooling fluid manifold comprises two first cooling fluid manifold walls facing respective first and second outer sidewalls of the trolley compartment, and wherein each of the first cooling fluid manifold walls comprises a first cooling fluid opening to connect the first cooling fluid manifold to a first and a second receiving space of the trolley compartment, respectively.

12. The galley cooling system according to claim 10, wherein the second cooling fluid manifold comprises a first portion associated with a first receiving space of the trolley compartment and a second portion associated with a second receiving space of the trolley compartment, a second cooling fluid opening being provided in each of second cooling fluid manifold wall portions associated with the first and second portions of the second cooling fluid manifold to connect the second cooling fluid manifold to the first and second receiving spaces of the trolley compartment, respectively.

13. A method of operating a galley cooling system for use in an aircraft, the method comprising:
providing a cooling fluid to a trolley compartment by a cooling unit, the trolley compartment comprising a front side access opening and a back wall arranged opposite the front side access opening, and the cooling unit comprising a cooling fluid outlet and a cooling fluid inlet;
directing the cooling fluid through a first cooling fluid manifold connected to the cooling fluid outlet or the cooling fluid inlet of the cooling unit, wherein the first cooling fluid manifold has at least one first cooling fluid manifold wall defining at least a portion of a lateral boundary of a receiving space of the trolley compartment, wherein the at least one first cooling fluid manifold wall extends in a direction between the front side access opening and the back wall of the trolley compartment approximately perpendicular to the back wall of the trolley compartment, and wherein the first cooling fluid manifold wall comprises a first cooling fluid opening to connect the first cooling fluid manifold to the receiving space of the trolley compartment; and
directing the cooling fluid through a second cooling fluid manifold connected to the cooling fluid inlet or the cooling fluid outlet of the cooling unit, the first cooling fluid manifold having a second cooling fluid manifold wall defining at least a portion of an upper boundary of the receiving space of the trolley compartment, wherein the second cooling fluid manifold wall comprises a second cooling fluid opening to connect the second cooling fluid manifold to the receiving space of the trolley compartment,
wherein the cooling unit is arranged inside the trolley compartment, outside of the lateral boundary of the receiving space of the trolley compartment defined by the at least one first cooling fluid manifold wall.

14. The method according to claim 13, wherein the first cooling fluid manifold is connected to the receiving space of the trolley compartment via a first cooling fluid opening provided in a region of the first cooling manifold wall adjacent to a floor of the trolley compartment.

15. The method according to claim 13, wherein the second cooling fluid manifold is integrated into a work desk of an aircraft galley.

16. The method according to claim 13, wherein the cooling unit is configured as a cooling station which is connectable to a central refrigerating device of a central cooling system of the aircraft.

17. The method according to claim 13, wherein:
the cooling fluid is directed through the first cooling fluid manifold, which comprises two first cooling fluid manifold walls facing respective first and second outer sidewalls of the trolley compartment, wherein each of the two first cooling fluid manifold walls comprises a first cooling fluid opening to connect the first cooling fluid manifold to a first and a second receiving space of the trolley compartment, respectively; and
the cooling fluid is directed through the second cooling fluid manifold, which comprises a first portion, which is associated with the first receiving space of the trolley compartment, and a second portion, which is associated with the second receiving space of the trolley compartment, a second cooling fluid opening being provided in each of second cooling fluid manifold wall portions associated with the first and second portions of the second cooling fluid manifold to connect the second cooling fluid manifold to the first and second receiving spaces of the trolley compartment, respectively.

18. The method according to claim 13, wherein the cooling fluid is directed through a first cooling fluid manifold arranged adjacent to a first outer sidewall of the trolley compartment or wherein the cooling fluid is directed through a first cooling fluid manifold arranged in an interior of the trolley compartment at a distance from the first outer sidewall and a second outer sidewall of the trolley compartment.

19. The method according to claim 18, wherein the cooling fluid is directed through a connecting manifold connecting the second cooling fluid manifold to the cooling fluid inlet or the cooling fluid outlet of the cooling unit, the connecting manifold having a connecting manifold wall defining at least a portion of the lateral boundary of the receiving space of the trolley compartment, the connecting manifold being arranged adjacent to the first outer sidewall of the trolley compartment or the connecting manifold being arranged in the interior of the trolley compartment away from the first and second outer sidewalls of the trolley compartment.

20. The method according to claim 19, wherein the cooling unit is arranged inside the trolley compartment adjacent to the first cooling fluid manifold and between the first cooling fluid manifold and the connecting manifold.

* * * * *